United States Patent [19]

Kuno et al.

[11] 3,737,684

[45] June 5, 1973

[54] SYSTEM FOR COMPENSATING FOR DRIFT IN SEMICONDUCTOR TRANSDUCERS

[75] Inventors: Hiroshi Kuno, Okazaki-shi; Kenji Suzuki, Hekkai-gun, Aichi; Mineo Ishikawa, Kariya-shi, all of Japan

[73] Assignees: Kabushiki Kaisha Toyota Chuo Kenkyusho; Toyoda Koki Kabushiki Kaisha, Nagoya, Japan

[22] Filed: Sept. 29, 1971

[21] Appl. No.: 184,804

[30] Foreign Application Priority Data

Sept. 30, 1970 Japan ....................45/86134

[52] U.S. Cl. ....................307/308, 307/304, 307/310

[51] Int. Cl. ....................H01v

[58] Field of Search....................307/304, 308, 310; 328/151

[56] References Cited

UNITED STATES PATENTS

| | | | |
|---|---|---|---|
| 3,304,507 | 2/1967 | Weekes et al. | 328/151 |
| 3,430,072 | 2/1969 | Stevens | 328/151 X |
| 3,504,194 | 3/1970 | Eastman et al. | 307/304 X |
| 3,510,696 | 5/1970 | Bargen et al. | 307/308 |
| 3,521,141 | 7/1970 | Walton | 328/151 X |
| 3,550,013 | 12/1970 | Gurol | 307/308 X |
| 3,582,690 | 6/1971 | Yerman | 307/308 |
| 3,648,196 | 3/1972 | Gay | 307/304 X |

*Primary Examiner*—John S. Heyman

*Attorney*—Norman F. Oblon, Stanley P. Fisher and Marvin J. Spivak

[57] ABSTRACT

A drift compensating system includes a detecting circuit having at least one semiconductor element to generate an output in proportion to a physical quantity to be applied thereto, a first terminal for providing the output, a switching element, a memory circuit connected to the first terminal through the switching element for memorizing the output upon closure of the switching element, and a second terminal connected to the memory circuit. Upon closure of the switching element the output is applied to the memory circuit to render the first and second terminals to be at the same potential to thereby cancel any drift. Upon a subsequent opening of the switching element, a potential difference appears between the terminals in accordance with any change of the output.

8 Claims, 10 Drawing Figures

INVENTORS
HIROSHI KUNO
KENJI SUZUKI
MINEO ISHIKAWA

BY Oblon, Fisher and Spivak
ATTORNEYS

SYSTEM FOR COMPENSATING FOR DRIFT IN SEMICONDUCTOR TRANSDUCERS

BACKGROUND OF THE INVENTION

1. Field Of The Invention

The present invention relates generally to a measuring system provided with a semiconductor transducer having a resistivity which is variable in proportion to a physical quantity to be applied thereto, and more particularly to a system for compensating for any drift of said semiconductor transducer.

2. Description Of The Prior Art

Conventionally a strain transducer has two semiconductor strain gages therein which are connected within a Wheatstone bridge circuit (as shown in FIG. 1) which generates an output voltage at output terminals (X, Y) in accordance with a strain to be applied to the transducer.

The two semiconductor strain gages ($G_1$, $G_2$) are usually made of thin slices of single-crystal germanium, silicon, or the like so as to have the same characteristics. However, it is practically inevitable that the two semiconductor strain gages have slightly different characteristics because of the extreme difficulty in the manufacture thereof. As a result of the difference in the characteristics between the two semiconductor strain gages a drift voltage will appear at the output terminals (X, Y) solely due to certain external disturbances, such for example as temperature changes, with lapse of time. Such a drift voltage may be present even if a strain is not applied to the semiconductor strain gages. Moreover, even though the two strain gages are respectively p-type and n-type semiconductors and therefore the drift voltages of the same will have opposite signs (as shown in FIG. 2), it is still impossible to reduce a resultant drift ($g_3$) to zero because it is impossible to render the respective resistivity changes substantially the same.

Thus, even after zero-adjustments are made to render the output terminals (X, Y) at the same potential for a particular ambient temperature, the aforementioned drift voltage will occur with subsequent changes in temperature. Such drift voltages will affect the output voltage appearing between the output terminals (X, Y) which is produced as a result of strain being applied to the semiconductor strain gages. The drift voltages therefore have resulted in a problem in the prior art which made it difficult to covert a physical quantity applied to a semi-conductor strain transducer into an exactly corresponding electric quantity.

SUMMARY OF THE INVENTION

It is, therefore, an object of the present invention to provide a new and improved unique and simple system for compensating for drift of semiconductor transducers.

It is another object of the present invention to provide a new and improved unique drift compensating system having a switching element interposed between a pair of output terminals to render the terminals at the same potential upon closure thereof to thereby cancel any drift.

It is still another object of the present invention to provide a new and improved unique drift compensating system having a memory circuit, connected to an output terminal through a switching element and connected to another output terminal, for memorizing and maintaining an output upon closure of the switching element, so that a potential difference may appear between the output terminals in accordance with the change of the output upon subsequent opening of the switching element.

One further object of the subject invention is the provision of a new and improved unique drift compensating system for semiconductor transducers such that highly accurate and precise measurements, such as pressure, acceleration and the like, are realized.

Briefly, according to the present invention, these and other objects are, in one aspect, achieved by providing a drift compensating system for a semiconductor transducer which includes a detecting circuit having at least one semiconductor element, said element having resistivity variable in proportion to a physical quantity to be applied thereto, a power supply to apply a voltage across the semiconductor element, a switch, and a memory circuit connected to the detecting circuit through the switch to memorize the output thereof. Furthermore, a first output terminal is connected to the detecting circuit so as to provide an output based on the change of the resistivity. A second output terminal is connected to the memory circuit for providing the output memorized in the memory circuit. The switch is interposed between the first output terminal and the memory circuit so that upon closure thereof the output of the detecting circuit may be applied to the memory circuit to render the first and the second output terminals to be at the same potential to thereby compensate for any drift, and upon the subsequent opening thereof, a potential difference may appear between the first and the second output terminals in accordance with any change in the output of the detecting circuit.

BRIEF DESCRIPTION OF THE DRAWINGS

The foregoing and other objects of the present invention will be more fully appreciated as the same becomes better understood from the following description of preferred embodiments when considered in connection with the accompanying drawings in which.

DETAILED DESCRIPTION OF THE PREFERRED EMBODIMENTS

Figures 1, 2, 3:
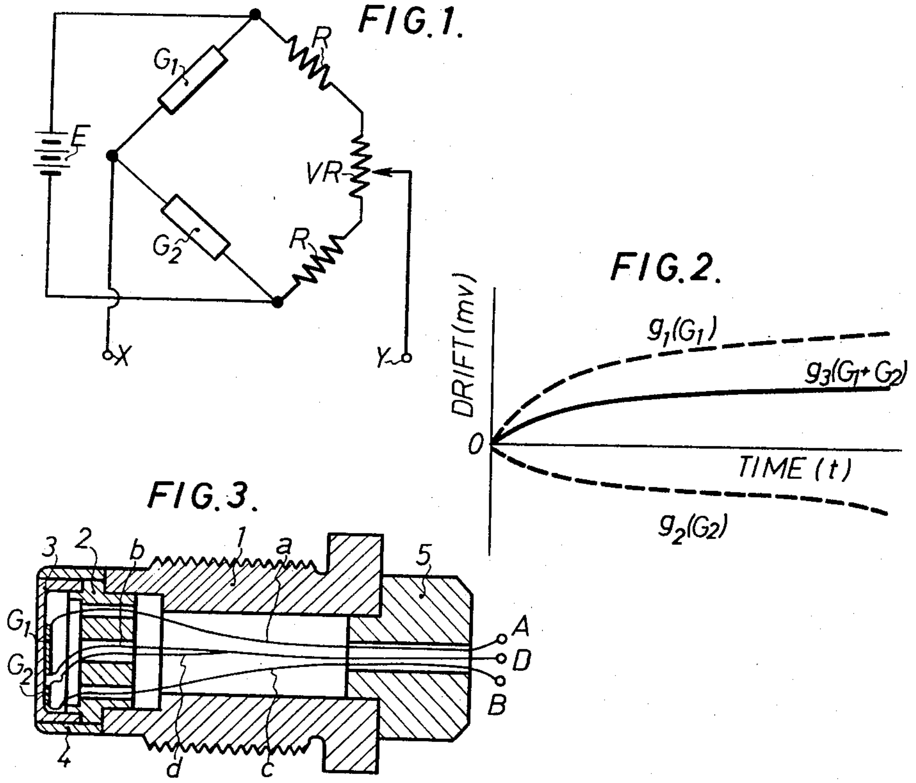
FIG. 1 is a circuit diagram showing a well-known Wheatstone bridge circuit having strain sensing members of piezoresistive semiconductive material therein.
FIG. 2 is a graph showing the drift produced in the circuit of FIG. 1 with lapse of time.
FIG. 3 is a longitudinally sectional view showing a semiconductor pressure transducer.

The invention will now be described by way of embodiments in connection with the accompanying drawings wherein like reference numerals designate identical, or corresponding parts throughout the several views.

Referring now to FIG. 3 a pressure transducer is shown as an example of a semiconductor type transducer. Reference numeral 1 designates a hollow cylindrical body. Mounted in the body 1 at one end thereof is a washer 2, to which a flexible diaphragm 3 is secured. A reinforcing ring 4 is provided at the outer periphery of the diaphragm 3. The diaphragm 3 constitutes a pressure sensitive portion.

Applied to the inner surface of the flexible diaphragm 3 are two semiconductor strain gages $G_1$ and $G_2$ nearly of the same characteristics. One of the strain gages, namely the gage $G_1$, is attached to the center of the diaphragm 3, so that tensile strain is generated in it due to the flexure of the diaphragm 3. The other strain gage $G_2$ is attached to a peripheral portion of the diaphragm 3, so that compressive strain is generated in it due to the flexure of the diaphragm 3. The semiconductor strain gages $G_1$ and $G_2$ have their ends connected to respective leads *a, b, c* and *d*. The leads *a* and *c* leading from one end of the respective strain gages $G_1$ and $G_2$ are taken out of the body 1 through a cap 5 secured to the rear end of the body, and are connected to respective terminals A and B. The leads b and d leading from the other end of the respective semiconductor strain gages $G_1$ and $G_2$ are commonly connected, and the common lead is taken out of the body through the cap 5 and connected to a terminal D. The terminals A, B and D are connected to a bridge circuit, not shown.

Figure 4:
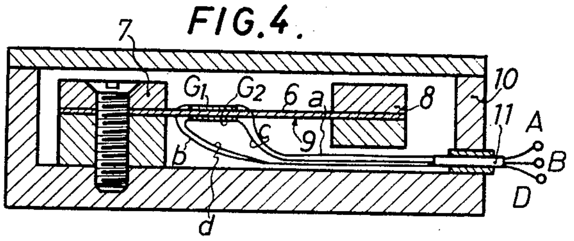
FIG. 4 is a longitudinally sectional view showing a semiconductor accelerometer.

Referring now to FIG. 4 a semiconductor accelerometer is shown as another example of a semiconductor type transducer. The semiconductor accelerometer has a cantilever beam 6 made of a resilient material, which has one end secured to a base member 7 and the other end free. The free end of the cantilever beam 6 carries a weight 8 which is secured thereto. The above parts constitute a vibrating element 9. The vibrating element 9 is placed in a container 10 containing a silicone oil sealed therein. Two semiconductor strain gages $G_1$ and $G_2$ of nearly the same characteristics are attached to the cantilever beam 6 along its longitudinal axis on the top and bottom surfaces thereof. As the cantilever beam 6 vibrates according to an acceleration applied to the weight 8, the semiconductor strain gages $G_1$ and $G_2$ will experience respective stresses. When a tensile strain is caused in the strain gage $G_1$, a compressive strain is caused in the strain gage $G_2$. On the other hand, when a compressive strain is caused in the strain gage $G_1$, a tensile strain is caused in the strain gage $G_2$. The semiconductor strain gages $G_1$ and $G_2$ have their ends connected to respective leads *a, b, c* and *d*. The leads a and c leading from one end of the strain gages $G_1$ and $G_2$ are taken out of the accelerometer body 10 through a lead pipe 11 penetrating the rear wall thereof, and are connected to respective terminals A and B. The leads *b* and *d* leading from the other end of the strain gages $G_1$ and $G_2$ are commonly connected, and the common lead is also taken out through the lead pipe 11 and connected to a terminal D. The terminals A, B and D are connected to a bridge circuit, not shown.

Figure 5:
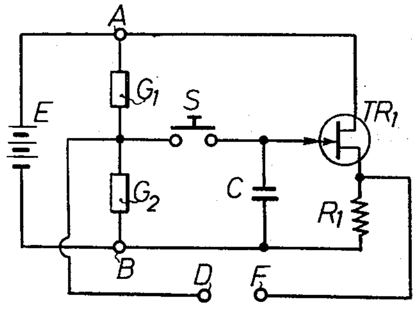
FIG. 5 is a circuit diagram showing a drift compensating circuit for semiconductor transducers.

FIG. 5 shows a first preferred embodiment of the present invention. In the Figure it is seen that a bridge circuit is provided in place of the conventional Wheatstone bridge used in the past. More particularly, the semiconductor strain gages $G_1$ and $G_2$ are connected in series between the terminals A and B. The terminal A is connected to the positive side of a power supply or battery E, having a constant voltage, while the terminal B is connected to the negative side of the power supply or battery E. The bridge circuit also includes a field-effect transistor $Tr_1$ (junction type), which has its drain connected to the terminal A, and hence to the positive side of the power supply or battery E, and its source connected through a resistor $R_1$ to the terminal B. There is also provided a capacitor C, as a memory element, one end of which is connected between the gate of the transistor $Tr_1$ and a switch S, and the other end of which is connected to the negative side of the power supply or battery E. The capacitor C, transistor $Tr_1$ and resistor $R_1$ constitute a memory circuit. Also, the gate of the transistor $Tr_1$ is connected to an output terminal D through the switch S. The output terminal D is connected to and between strain gages $G_1$ and $G_2$.

When the switch S is closed, the transistor $Tr_1$ forms a source follower which is controlled by its gate voltage. In this state, a potential substantially equal to the gate voltage appears at an output terminal F which is connected to the source of the transistor $Tr_1$. Thus, in this state the output of the bridge circuit which appears at the output terminal D controls the transistor $Tr_1$, while at the same time the output is applied to the capacitor C and is memorized therein. When the switch S is open, the transistor $Tr_1$ is not controlled by the output C. Thus, in this state the current flowing from the drain to the source of the transistor $Tr_1$ is controlled by the gate voltage, which is substantially the same as the bridge output potential when the switch S is closed. It will be seen that after the switch S is opened, the output at the output terminal F continues to be held at substantially the same level as that immediately before the opening of the switch S.

The switch S may be manually switched through a suitable push button. Alternatively, where the invention is applied to a cyclic operation, it may be automatically switched at a predetermined interval during the part of each cycle when there is no strain applied to the strain gages $G_1$ and $G_2$.

When there is no strain in the strain gages $G_1$ and $G_2$ of the above semiconductor transducers, there is no change of the resistivity due to strain in the strain gages $G_1$ and $G_2$, so that no output corresponding to any strain appears at the output terminal D. However, with a lapse of time, temperature condition changes will change the resistivity of the semiconductor strain gages $G_1$ and $G_2$. Such changes in temperature will cause a drift output to appear at the output terminal D. If the switch S is closed when there is a drift output, the drift output is memorized in the capacitor C, and the memorized potential (drift output) is impressed on the gate of the field-effect transistor $Tr_1$. The voltage thus impressed controls the transistor $Tr_1$, that is, the current flowing from the drain connected to the positive side of the power supply or battery E to the source of the transistor. As a result thereof, the voltage impressed on the gate of the transistor $Tr_1$, that is, the drift output due to the change of temperature of the semiconductor strain gages $G_1$ and $G_2$ appears at the output terminal F. In actuality, there is a slight gate leakage current which flows from the gate into the source of the transistor, so that the output voltage at the output terminal F decreases according to the gate voltage drop due to the gate leakage current. The gate leakage current, however, is negligibly slight, so that it is possible to have the output at the output terminal F lower than the drift output due to the change of temperature of the strain gages $G_1$ and $G_2$ by selecting the capacitance of the capacitor C to an appropriate value.

In the above manner, the potential difference between the output terminals D and F is eventually rendered substantially zero, thus accurately and readily effecting a zero adjustment of the semiconductor transducer. After the zero adjustment is thus effected, the switch S is opened, and thereafter the output at the output terminal F is maintained at the level of the voltage memorized in the capacitor C. By subsequent measurements of pressure or acceleration by the semiconductor transducer, a strain is generated in the semiconductor strain gages $G_1$ and $G_2$ in accordance with the pressure or acceleration being measured, thus producing a corresponding change of resistivity of the strain gages $G_1$ and $G_2$, so that an output corresponding to the strain in the strain gages $G_1$ and $G_2$ appears at the output terminal D. This output is taken out as the potential difference between the output terminals D and F. If the potential corresponding to the strain in the strain gages $G_1$ and $G_2$ is lower than the potential memorized in the capacitor C at the time of the zero adjustment, the load at the capacitor C is discharged through the strain gage $G_2$ to effect the zero adjustment.

As has been described, according to the present invention by repeatedly closing the switch S at a predetermined interval during a part of each cycle when there is no pressure or acceleration applied, the drift output due to a change in temperature with lapse of time may be repeatedly cancelled to repeatedly effect the zero adjustment of the semiconductor transducer. Thus, any drift output produced due to a change in temperature is cancelled before it becomes large.

Figure 6:
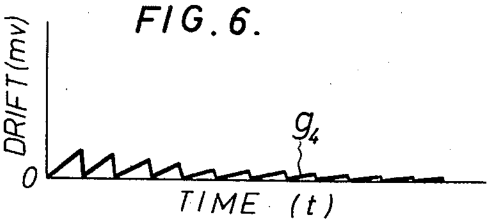
FIG. 6 is a graph showing how the drift is compensated for in the circuit of FIG. 5 with lapse of time.

FIG. 6 shows the behavior of the drift indicated by a sawtooth-like curve $g_4$ plotted against time. As is shown, the recurring drift is extremely small, and it completely disappears after an equilibrium state of the drift is reached as shown in FIG. 2.

Thus, according to the present invention, a reliable zero adjustment can be attained without the provision or necessity of any conventional temperature compensating circuit, and extremely precise measurements of a desired physical quantity such as pressure and acceleration, and thereby enabled.

It should be understood that although the preceding embodiment of FIG. 5 has been described using a junction type field-effect transistor, the invention is not so limited, and MOS type field-effect transistors may be used as well. Also, it is possible to alternatively use triodes, pentodes, and the like which are similar in operation and effect to the field-effect transistor. Likewise, the following embodiments are described using junction type field-effect transistors, but it is to be understood that the invention is not so limited.

In case a MOS type field-effect transistor is used, one of the two gates that corresponds to the gate of a junction type field-effect transistor may be connected through the switch S to the output terminal D, and the other gate may be connected to a source circuit for eliminating noises. The other circuit components may be similar to those described in the preceding embodiment.

FIGS. 7, 8, 9 and 10 show respective other alternative and preferred embodiments of the present invention.

Figures 7, 8, 9, 10:
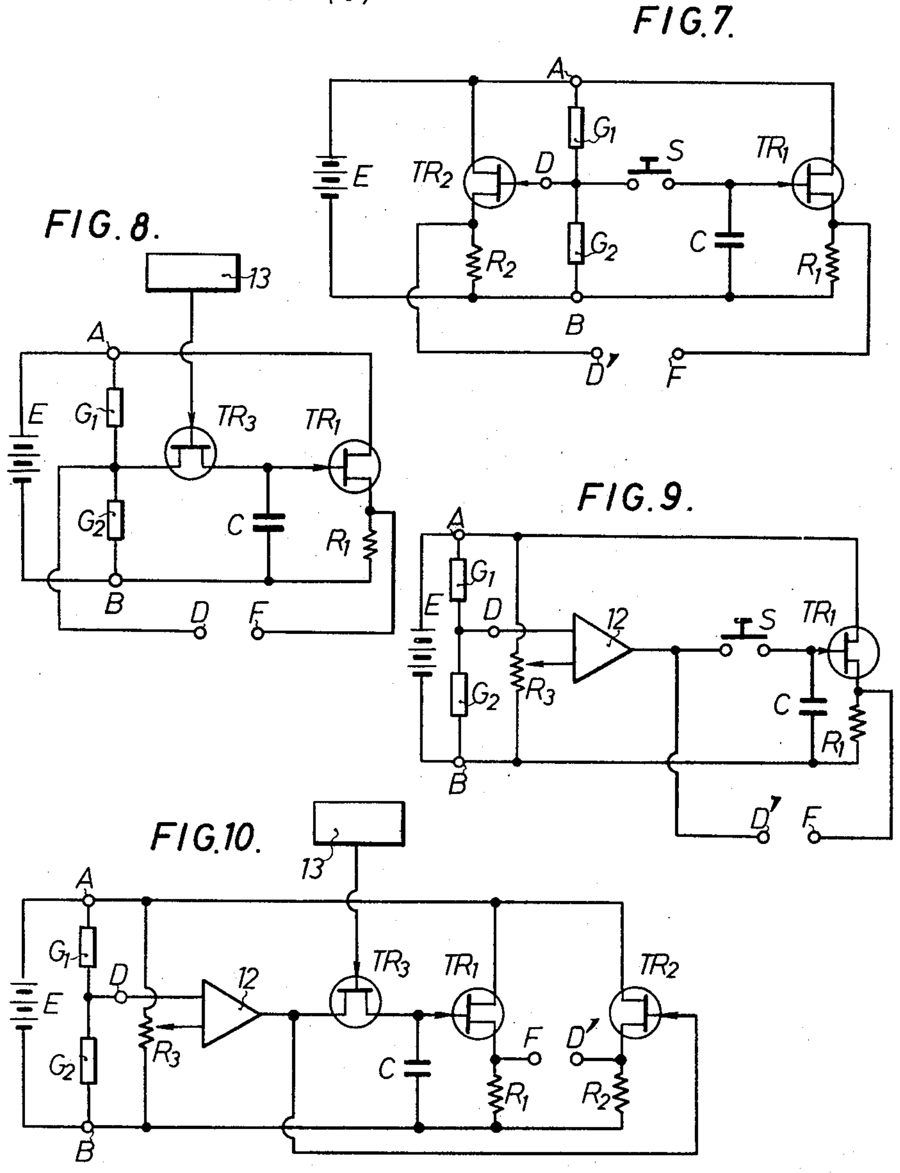
FIGS. 7, 8, 9 and 10 are circuit diagrams showing respective and alternative modifications of the drift compensating circuit of FIG. 5.

The embodiment of FIG. 7 has an additional or second field-effect transistor $Tr_2$ having the same characteristics as the aforesaid field-effect transistor $Tr_1$. The second field-effect transistor $Tr_2$ has its gate connected to the terminal D so as to be supplied with an output voltage based on the change of resistivity of the strain gages $G_1$ and $G_2$, its drain connected to the positive side of the power supply or battery E, and its source connected through a resistor $R_2$ to the negative side of the power source or battery E. A separate output terminal D' is connected to the source of the second field-effect transistor $Tr_2$.

This embodiment is desirable to supplement the insufficient effects of the preceding embodiment of FIG. 5 for measurements requiring increased precision. The preceding embodiment of FIG. 5, which uses only a single field-effect transistor $Tr_1$, presents the following shortcomings:

a. There is a transmission loss due to the source follower connection of the field-effect transistor.

b. The field-effect transistor itself is of a character subject to a slight drift due to change in temperature.

c. The potential at the output terminal F cannot be held exactly at the level memorized in the capacitor C because of the gate leakage current reducing the gate voltage.

In the instant embodiment, the above shortcomings (a) and (b) can be compensated for by the two field-effect transistors $Tr_1$ and $Tr_2$ having the same characteristics. Thus, the output difference between the output terminals F and D' is free from drift attributable to the characteristics of the field-effect transistors themselves.

The embodiment of FIG. 8 has a switching field-effect transistor $Tr_3$, which is provided in lieu of the switch S in the preceding embodiment of FIG. 5. The transistor $Tr_3$ has its gate connected to a pulse generator 13. With an output from the pulse generator 13, the drain-source path of the switching field-effect transistor $Tr_3$ is turned conductive to permit the output based on the change of resistivity of the semiconductor strain gages $G_1$ and $G_2$ to be impressed on the gate of the transistor $Tr_1$. Thus, in this embodiment the zero adjustment can be effected totally automatically without requiring any manual service. This automatic zero adjustment can be effected by arranging the pulse generator 13 to deliver an output pulse to the gate of the switching field-effect transistor $Tr_3$ at the commencement of each measurement cycle at a time wherein there is no strain in the semiconductor strain gages $G_1$ and $G_2$.

In the embodiment of FIG. 9, unlike the preceding embodiments of FIGS. 5, 7 and 8, the semiconductor strain gages $G_1$ and $G_2$ are connected in a half Wheatstone bridge circuit which includes an intermediately tapped, variable resistor $R_3$. Once the resistor $R_3$ is fixed, the distribution of the resistance value thereof, i.e. the position of the tap, will not be changed unless the strain gages are replaced by those having a different ratio of the resistance values. In addition, the output terminal D is connected to an operational amplifier 12, to which an output is applied based on the change of resistivity of the semiconductor strain gages $G_1$ and $G_2$, and whose amplified output appears at the output terminal D'. The output of the operational amplifier 12 is also coupled through the switch S to the gate of the field-effect transistor $Tr_1$.

In this embodiment, unlike the preceding embodiments, the half bridge circuit can be preliminarily balanced through the variable resistor $R_3$. Thus, any drift of the half bridge circuit due to a subsequent temperature change is extremely slight. This slight drift output is amplified by the operational amplifier 12, and the amplified output appears at the output terminal D'. Upon closure of the switch S, the output terminal F is brought to substantially the same potential level as the amplified output level, rendering the potential difference between the output terminals F and D' substantially zero. After a subsequent opening of the switch S, the output terminal F is maintained at a low potential compared to the preceding embodiments. On the other hand, the half bridge output based on the change of resistivity of the semiconductor strain gages $G_1$ and $G_2$ is also amplified by the operational amplifier 12, and the amplified output appears at the output terminal D'. Thus, the resultant potential difference between the output terminals F and D' is very large compared to that in the preceding embodiments.

Also, in this embodiment the gate potential on the transistor $Tr_1$ is comparatively low, so that the gate voltage drop due to the gate leakage current and the drift in the transistor $Tr_1$ are reduced. Thus, this circuit is useful for still higher precision measurements.

The embodiment of FIG. 10 is an automatic zero adjustment circuit, in which all of the features of the preceding embodiments of FIGS. 5, 7, 8 and 9 are incorporated. It comprises all of the previously noted circuit components, namely, the half bridge circuit including semiconductor strain gages $G_1$ and $G_2$ and the variable resistor $R_3$, the operational amplifier 12, the switching field-effect transistor $Tr_3$ controlled by the pulse generator 13, the first field-effect transistor $Tr_1$ as an amplifying element, the second field-effect transistor $Tr_2$ of the same characteristics as the first one and capacitor C, as well as the power supply or battery E. This circuit construction does not substantially suffer from a source voltage drop loss to the source follower connection of the field-effect transistor from thermal drift of the field-effect transistor itself, and from the gate voltage drop due to the gate leakage current in the field-effect transistor. The present embodiment has the feature of automatically compensating for the thermal drift in the measurement circuit of the semiconductor strain gages and of also allowing an output change, based on the change of resistivity of the semiconductor strain gages according to a physical quantity such as pressure and acceleration, to be precisely detected as a large potential difference between the two output terminals.

In further detail, it is seen that in FIG. 10, the semiconductor strain gages $G_1$ and $G_2$ are connected in a half Wheatstone bridge circuit, which is preliminarily balanced through the variable resistor $R_3$. The semiconductor strain gages $G_1$ and $G_2$ are also connected to the power supply or battery E, so that a supply voltage is always applied to them. The output terminal D of the half bridge circuit is connected to the operational amplifier 12, the output of which is in turn connected to both the drain of the switching field-effect transistor $Tr_3$ and to the gate of the second field-effect transistor $Tr_2$. The switching transistor $Tr_3$ has its gate connected to the pulse generator 13 and its source connected to the gate of the first field-effect transistor $Tr_1$, so that its drain-source path may be rendered conductive by a pulse output of the pulse generator 13 to thereby permit the output of the operational amplifier 12 based on the change of resistivity of the semiconductor strain gages $G_1$ and $G_2$ to be impressed on the gate of the first transistor $Tr_1$. The first transistor $Tr_1$ has the same characteristics as the second transistor $Tr_2$. Both of the field-effect transistors $Tr_1$ and $Tr_2$ are connected in parallel with the power supply or battery E, with the drain of the transistors $Tr_1$ and $Tr_2$ connected to the positive side of the power supply or battery E and the source of the transistors $Tr_1$ and $Tr_2$ connected to the negative side of the power supply or battery E through the resistors $R_1$ and $R_2$ respectively. The sources of the transistors $Tr_1$ and $Tr_2$ are also connected to the respective output terminals F and D'. Thus, when the drain-source path of the switching transistor $Tr_3$ is conductive, the output terminals F and D' are at the same potential. The capacitor C is connected, in parallel with the resistor $R_1$, between the gate of the first transistor $Tr_1$ and the output terminal B. The first transistor $Tr_1$ acts as an amplifying element and the resistor $R_1$ and the capacitor C constitute the memory circuit. Thus, when the drain-source path of the switching transistor $Tr_3$ is conductive, the output at the output terminal D based on the change of resistivity of the semiconductor strain gages $G_1$ and $G_2$ which is amplified by the operational amplifier 12 is memorized in the capacitor C, and when the drain-source of the transistor $Tr_3$ is non-conductive, the voltage memorized in the capacitor C corresponds to the previous output at the output terminal D and is applied to the gate of the first transistor $Tr_1$.

With the above construction of the embodiment of FIG. 10, by adjusting the timing of the conduction of the drain-source path of the switching transistor $Tr_3$ by the application of timely pulses from pulse generator 13 so as to coincide with the period when there is no strain in the semiconductor strain gages $G_1$ and $G_2$ due to the physical quantity such as pressure and acceleration to be detected, it there occurs an output change as a result of change of resistivity of the semiconductor strain gages $G_1$ and $G_2$ due to other causes such as temperature change rather than the physical quantity to be detected, the output potential will be applied from the output terminal D to the operational amplifier 12, and the amplified output therefrom will be impressed upon the gate of the first transistor $Tr_1$ as well as upon the gate of the second transistor $Tr_2$. This in turn will control the current flowing from the drain to the source of the individual transistors $Tr_1$ and $Tr_2$, so that the output terminals F and D' will be brought to substantially the same potential as the output potential of the operational amplifier 12. At this time, the thermal drifts in the first and second transistors $Tr_1$ and $Tr_2$ will cancel each other, since these transistors have the same characteristics and differentially will operate under the same temperature conditions. Also, any transmission losses in the transistors due to the source follower connection thereof will be mutually compensated for. Thus, almost perfect zero adjustment between the output terminals F and D' may be achieved. Further, since the half bridge circuit consisting of the semiconductor strain gages $G_1$ and $G_2$ and the variable resistor $R_3$ is preliminarily balanced through the variable resistor $R_3$, the drift in the half bridge circuit due to subsequent irrelevant causes such as temperature change will be extremely slight. At any rate, such a slight drift is automatically zero adjusted upon the conduction of the drain-source path, as mentioned above. Furthermore, upon the conduction of the drain-source path of the transistor $Tr_3$, the potential impressed on the gate of the transistor $Tr_1$ is at the same time memorized in the capacitor C of the memory circuit, and upon the nonconduction of the drain-source path of the transistor $Tr_3$, the memory circuit functions to maintain the level of the potential at the output terminal F at the same value as before nonconduction. In the instant embodiment, the gate voltage on the transistor $Tr_1$ is comparatively low, so that the gate voltage drop due to gate leakage current is small, and highly precise maintenance of the potential at the output terminal F may be ensured.

When the drain-source path of switching transistor $Tr_3$ is nonconductive, in the absence of a pulse output from the pulse generator 13, any output change based on the change of resistivity of the semi-conductor strain gages $G_1$ and $G_2$ is amplified by the operational amplifier 12 to provide the amplified output appearing at the output terminal D'. Since, among the potential applied to the output terminal D', the corresponding output based on change of resistivity due to irrelevant causes, such as temperature change is already applied to the output terminal F, only the output attributable to a change of resistivity of the semiconductor strain gages $G_1$ and $G_2$ due to a strain therein caused by a corresponding physical quantity such as pressure and acceleration to be detected, can be detected as a large potential difference between the output terminals F and D', so that the physical quantity in question can be extremely accurately measured.

Although in the preceding embodiments two semiconductor strain gages have been used, it is of course possible to replace one of the semiconductor strain gages with a resistor. Also, more than two semiconductor strain gages may be used if desired.

Furthermore, the invention may be applied to compensate for drift due to irrelevant causes, such as temperature change, not only in semiconductor pressure transducers and semiconductor accelerometers, but also in semiconductor displacement gages, semiconductor load gages and other semiconductor transducers utilizing the strain-resistance characteristic of the semiconductor. Likewise the invention may be equally applied to compensate for drift due to other irrelevant causes such as change in external pressure in semiconductor transducers utilizing the temperature-resistance characteristic of the semiconductor and using a semiconductor element as a thermistor.

Obviously other changes and modifications are possible without departing from the scope and spirit of the invention as claimed in the claims.

What is claimed and desired to be secured by Letters patent of the United States is:

1. A drift compensating system for a semiconductor transducer, comprising:

a detecting circuit including at least one semiconductor element, said semiconductor element having a resistivity which is variable in proportion to a physical quantity to be applied thereto;

power supply means connected to said detecting circuit for applying a voltage across said element;

a first output terminal connected to said detecting circuit so as to provide an output based on the change of said resistivity;

switching means connected to said first output terminal and closed before the measurement of said physical quantity for compensating any drift of said semiconductor element;

a memory circuit having an amplifying element connected to said power supply means, a resistor connected between said amplifying element and said power supply means, and a capacitor, one end of which is connected between said amplifying element and said switching means and the other end of which is connected to said power supply means, for memorizing said output of said detecting circuit as a reference voltage in the measurement of said physical quantity upon closure of said switching means; and a second output terminal connected to said memory circuit for providing the output memorized in said memory circuit, whereby upon closure of said switching means said output of said detecting circuit is applied to the memory circuit to render said first and said second output terminals at the same potential to thereby compensate for any drift, and upon the subsequent opening of said switching means a potential difference appears between said first and said second output terminals in accordance with any change of said output of said detecting circuit.

2. A drift compensating system according to claim 1, in which said switching means comprises:

a field-effect transistor having a gate, a drain connected to said detecting circuit and said first output terminal and a source connected to said memory circuit; and, a pulse generator connected to said gate for automatically delivering an output pulse to said gate at the commencement of each measuring cycle for permitting said output of said detecting circuit to be impressed on said memory circuit.

3. A drift compensating system according to claim 1, in which said amplifying element is a field-effect transistor having a drain connected to said power supply means, a gate connected to said switching means and said capacitor, and a source connected to said second output terminal and said resistor, and further comprising another field-effect transistor having a drain connected to said power supply means, a gate connected to the output terminal of said detecting circuit, and a source connected to said first output terminal, said another field-effect transistor having the same characteristics as said field-effect transistor, and a resistor connected between said source of said another field-effect transistor and said power supply means.

4. A drift compensating system according to claim 1, in which said detecting circuit is a half-bridge circuit comprising a pair of semiconductor elements, and wherein said first output terminal being connected to and between said pair of semiconductor elements.

5. A drift compensating system according to claim 1, in which said detecting circuit comprises:

a bridge circuit having an output therefrom and including a pair of semiconductor elements and a variable resistor having an intermediate tap thereon for preliminarily balancing said bridge circuit, and an operational amplifier connected to said intermediate tap and between said semiconductor elements for amplifying the output of said bridge circuit based on a change of resistivity of said semiconductor elements, said operational amplifier having an output terminal connected to said switching means and said first output terminal.

6. A drift compensating system for a semiconductor transducer comprising:

a bridge circuit including a pair of semiconductor elements to generate an output in accordance with a physical quantity to be applied thereto and a semi-fixed resistor having an intermediate tap thereon to preliminarily balance said bridge circuit;

an operational amplifier connected to said intermediate tap and between said semiconductor elements for amplifying said output and having an output terminal;

power supply means connected to said bridge circuit for applying a voltage across said semiconductor elements and across said semi-fixed resistor;

switching means;

a first-effect transistor having a source, a gate connected to the output terminal of said operational amplifier through said switching means, and a drain connected to said power supply means;

a first resistor connected to said source;

a second field-effect transistor having a source, a gate connected to the output terminal of said operational amplifier, and a drain connected to said power supply means, said second field-effect transistor having the same characteristics as said first field-effect transistor;

a second resistor connected to the source of said second field-effect transistor;

a first output terminal connected to and between said second resistor and the source of said second field-effect transistor;

a second output terminal connected to and between said first resistor and the source of said first transistor; and, a capacitor, one end of which is connected to said field-effect transistor and said switching means and the other end of which is connected to said power supply means, for memorizing the output of said operational amplifier upon closure of said switching means and connected to the gate of said first field-effect transistor for controlling said first field-effect transistor so as to maintain the potential at said second output terminal equal to the potential memorized in said capacitor, whereby upon closure of said switching means the output of said operational amplifier is applied to said capacitor and the gates of said first and said second field-effect transistors to render said first and said second output terminals at the same potential to thereby compensate for any drift and upon a subsequent opening of said switching means a potential difference appears between said first and second output terminals in accordance with a change of said output of said operational amplifier.

7. A drift compensating system according to claim 6, in which said switching means comprises:

a field-effect transistor having a gate, a drain connected to the output terminal of said operational amplifier, a source connected to said capacitor and the gate of said first field-effect transistor; and, a pulse generator connected to said gate of said field-effect transistor of said switching means for automatically delivering an output pulse to said gate of said field-effect transistor of said switching means at the commencement of each measuring cycle for permitting the output of said operational amplifier to be imposed on said capacitor.

8. A drift compensating system according to claim 1, wherein said power supply means is a single power supply.

* * * * *